United States Patent
Buhrgard et al.

(10) Patent No.: US 6,671,255 B1
(45) Date of Patent: Dec. 30, 2003

(54) METHOD AND APPARATUS IN A PACKET SWITCHED NETWORK

(75) Inventors: Magnus Buhrgard, Bromma (SE); Krzysztof Kaminski, Tullinge (SE); Bernt Larsson, Lidingö (SE); Göran Wicklund, Nacka (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/440,769

(22) Filed: Nov. 16, 1999

Related U.S. Application Data (63) Continuation of application No. PCT/SE98/00896, filed on May 14, 1998.

(30) Foreign Application Priority Data

May 16, 1997 (SE) ................................................ 9701841

(51) Int. Cl.$^7$ ........................ H04L 12/56; H04L 12/26; G06F 11/00
(52) U.S. Cl. ...................... 370/230; 370/236; 370/244; 370/388; 370/390; 370/429
(58) Field of Search ................................ 370/229, 230, 370/231, 235, 236, 242, 244, 254, 255, 386, 388, 390, 395.1, 412, 428, 429

(56) References Cited

U.S. PATENT DOCUMENTS

| | | | |
|---|---|---|---|
| 5,253,248 A | | 10/1993 | Dravida et al. |
| 5,319,638 A | | 6/1994 | Lin |
| 5,457,687 A | * | 10/1995 | Newman ............... 370/232 |
| 5,475,682 A | | 12/1995 | Choudhury et al. |
| 5,493,566 A | * | 2/1996 | Ljungberg et al. .......... 370/231 |
| 5,689,500 A | * | 11/1997 | Chiussi et al. ............. 370/235 |
| 5,787,071 A | * | 7/1998 | Basso et al. .............. 370/231 |
| 5,790,770 A | * | 8/1998 | McClure et al. ............ 709/231 |
| 5,825,751 A | * | 10/1998 | Papierniak et al. ......... 370/248 |
| 6,011,779 A | * | 1/2000 | Wills ..................... 370/236 |
| 6,052,376 A | * | 4/2000 | Wills ..................... 370/419 |
| 6,490,248 B1 | * | 12/2002 | Shimojo .................. 370/229 |

FOREIGN PATENT DOCUMENTS

| | | |
|---|---|---|
| EP | 0 374 928 | 6/1990 |
| EP | 0 512 495 | 11/1992 |
| EP | 0 647 081 | 4/1995 |
| EP | 0 661 851 | 7/1995 |
| EP | 0 712 220 | 5/1996 |
| EP | 0 719 012 | 6/1996 |
| WO | 95/19675 | 7/1995 |

OTHER PUBLICATIONS

Leonardi et al, Congestion Control in Asynchronous High–speed Wormhole Routing Networks, IEEE 1996, vol. 34, Issue 1 pp. 58–69.*

Chiussi et al, Backpressure in Shared–Memory–Based ATM Switches under Multiple Bursty Sources, IEEE 1996, vol. 2, pp. 830–843.*

* cited by examiner

*Primary Examiner*—Hassan Kizou
*Assistant Examiner*—Ahmed Elallam (57) ABSTRACT

A method for the relative flow control of a data flow, and a switch in which the method may be applied, are described. A buffer unit that reaches a certain degree of fullness sends a message to all units from which it receives data that it cannot receive any more data or that it can only receive at a reduced rate. The message is forwarded by each unit that receives it, to each unit from which it receives data and comprises a level indicator field, which is incremented for each unit it passes. For each unit passed a field is also added, identifying the unit from which it was received. Each unit is denoted by its number among all units receiving packets from the level above it. The message may be valid either for a certain period of time or until a new message is transmitted indicating that the problems have ceased.

18 Claims, 4 Drawing Sheets

METHOD AND APPARATUS IN A PACKET SWITCHED NETWORK

This application is a continuation of International application No. PCT/SE98/00896 filed on May 14, 1998.

TECHNICAL FIELD

The present invention relates to a method and an apparatus for flow control of a data packet flow.

BACKGROUND

Traditionally, the traffic in ATM networks has been dominated by Constant Bit Rate (CBR) connections. This type of connection requires that the network, and all nodes in the network, be dimensioned in such a way that all subscribers can utilize their peak load at the same time, so that the risk of congestion in a buffer is small or negligible.

New services such as Available Bit Rate (ABR), Variable Bit Rate (VBR), real-time Variable Bit Rate (rt-VBR) and Unspecified Bit Rate (UBR), on the other hand, imply a very uneven and unpredictable flow, in which the information packets are transferred in bursts. If all buffers on all levels were to be dimensioned to handle this, very large buffer memories would be required, which would in turn lead to long storage times causing long delays.

A known solution to the problem is to provide a separate unit in the exchange, receiving information from all buffers about their degree of fullness, and, if a buffer becomes too full, transmits a bandwidth limiting signal to all units transmitting cells to this buffer. An apparatus and a method based on this principle are disclosed in European Patent Specification EP 0 374 928 A2.

EP 0 661 851 A2 describes a method for blockage supervision in a packet switched network in which threshold values are used to determine if a unit in the network has reached a too high degree of fullness. The information about a unit having a too high degree of fullness is added in the header field of a cell passing through the unit.

When the cell reaches the receiver, the receiver transmits a message to the source, that the transmission rate has to be decreased.

Alternatively, the unit for which the degree of fullness is too high transmits such a message itself.

SUMMARY

An object of the present invention is to provide a method and an apparatus for flow control which will maximize the utilization of the parts of the network when the traffic has a burst character.

Another object of the invention is to provide a packet switched exchange, such as an ATM exchange, that can provide new service classes, such as ABR, VBR, rt-VBR and others.

These objects are achieved according to the invention through flow control by means of relative addressing of buffers according to the following:

a receiving unit which is permanently or temporarily unable to receive data packets transmits a backpressure message to the unit or units from which it is arranged to receive data packets;

a unit receiving such a backpressure message changes and/or makes additions to this message so that it comprises information about all units that the message has passed;

the source node or nodes for the data packet flows, when a backpressure message is received, reduces or stops all data packet flows intended to pass the unit from which the backpressure message originated.

The backpressure message comprises a first field (m) indicating the number of levels passed by the message.

According to a first preferred embodiment the following steps are repeated for each unit passed by the message:

incrementing the message level indicator in the first field (m);

adding a field indicating from which unit the message last came, relative to the unit in which the message is currently found;

forwarding the message to all units from which the unit in which the message is currently found is arranged to receive data.

According to a second preferred embodiment the following steps are repeated for each unit passed by the message:

incrementing the message level indicator in the first field (m);

adding a field indicating the unit in which the message is now located, relative to the level from which this unit is arranged to receive data packets;

forwarding the message to all units from which the unit in which the message is currently found is arranged to receive data.

The unit from which a backpressure message is received in another unit is identified by its number, of the total number of units, to which the receiving unit is connected.

A standard value may be set for how long a back pressure message should be considered valid.

The message may also comprise an extra field arranged to contain additional information, which may, for example, be arranged to assume one of two possible values indicating that the backpressure message signifies the start of the problems and that the problems have ceased, respectively. The field for additional information may also comprise information about the degree of fullness of the buffer, indicating the action to be taken by the receiving unit in response to the backpressure message, or information about the length of the period in which the backpressure message should be considered valid.

The unit from which the backpressure message originates may be a buffer in a hierarchy of buffers in a packet switch, and that the unit receiving and acting on the backpressure message is a buffer on a higher level in the same buffer hierarchy.

The unit from which the backpressure message originates may also be a node in a packet switched network and that the unit receiving and acting on the backpressure message is a host in said packet switched network.

A hierarchical structure of buffers in which each buffer is arranged to receive data packets from at least one buffer on the next preceding hierarchical level and to transmit data packets to at least one buffer on the next succeeding hierarchical level is also disclosed comprising, for each buffer, or for a group of buffers on the same hierarchical level, control logic, arranged to compare the degree of fullness of the buffer or buffers to one or more threshold values;

when the degree of fullness of a buffer exceeds a threshold value, transmit a back-pressure message to the next preceding hierarchical level;

when such a backpressure message is received from the control logic of a buffer on a subsequent hierarchical level, change or add information to this message so that it will comprise information about the unit the message has passed.

A node for use in a packet switched network is also disclosed, which is arranged to when a problem with the reception or transmission of packets to or from the node arises: transmit a backpressure message indicating the character of the problem to all nodes in the network from which the node receives packets;

when a backpressure message is received, add information to the message so that the message comprises information about all nodes the message has passed.

An advantage of the solution according to the invention is that the method may be used independently of the size of the exchange (and thus of the exchange core), and the network.

For the method to be used, an arbitrary buffer in the exchange core does not have to know its own location in the system, or how many other buffers, or nodes, respectively, are found on the same hierarchical level.

A level in a structure according to the invention may be defined as a place in the structure where a path selection is made. In these places data packets must be stored in buffers, since data packets may be received from several different units in the level immediately above.

BRIEF DESCRIPTION OF THE DRAWINGS

The method according to the invention will be described in more detail below, with particular reference to the drawings, in which.

DETAILED DESCRIPTION

Figure 1:
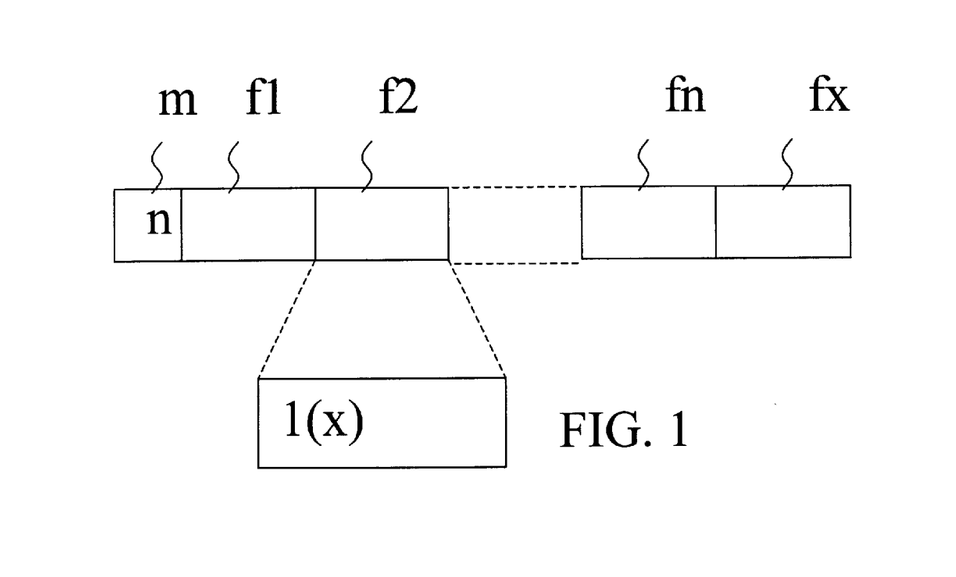
FIG. 1 is a schematic representation of the structure of the message format according to the invention.

FIG. 1 is a schematic representation of the structure of a backpressure message according to the invention. The message comprises a message level indicator field m, which accompanies the message from the original level all the way to the receiver. According to a preferred embodiment the message level indicator field m comprises a number n indicating how many buffer levels the message has passed. When the backpressure message is transmitted from the original level, it comprises a field, the message level indicator field m, comprising an integer, which may be, for example, 0. The backpressure message can also comprise one or more freely selectable fields fx, which may comprise, for example, information about the severity of the problem. Optionally, the message may be transmitted from the original level in the form of a pulse only, since a dedicated wire is used for the flow control signalling. For each level passed by the message the number n is incremented by 1. A unit receiving a backpressure message also adds a field f1, f2, . . . , fn, showing which one of the units to which it transmits that the message came from. The number of fields in the message depends on the number of buffer levels in the hierarchy that the message has passed.

For the method to work, the final receiver of the backpressure message, which is the source in the traffic flow, must know the underlying structure so that the receiver can determine what data flow is to be limited or stopped. According to a preferred embodiment the fields f1, . . . ,fn also comprise information about the number of units on the level in question. The information in the field f2 therefore indicates that the message has passed the first of a total of x buffers on the level in question. This information may be omitted to save bandwidth in the backpressure signal, but this would require more information about the structure to be found in the receiver of the message.

Figure 2:
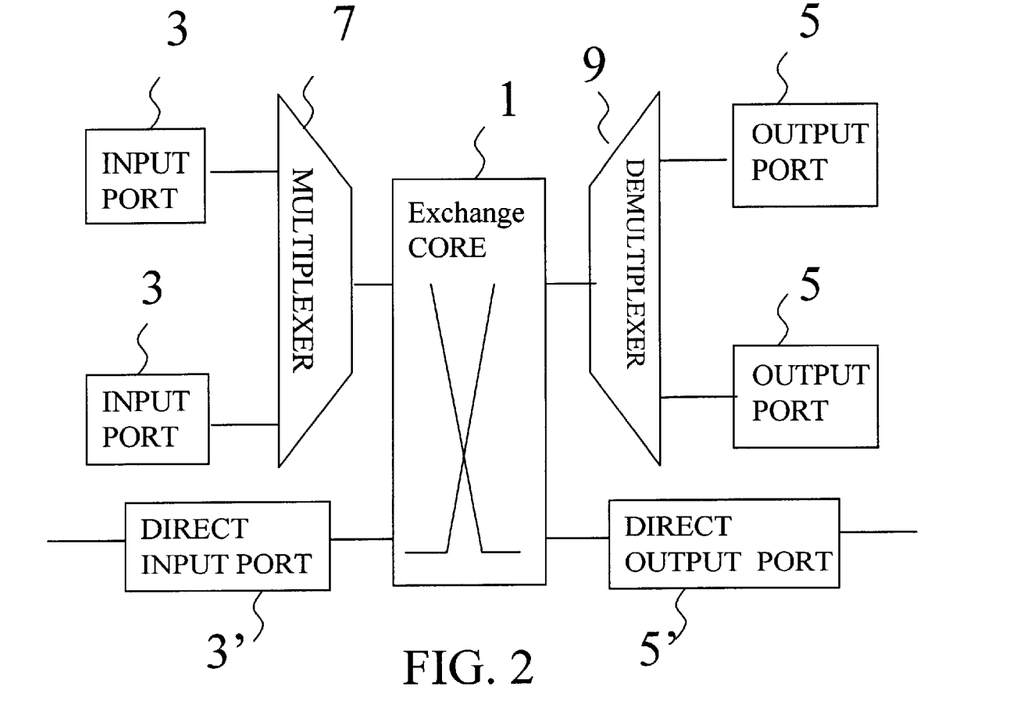
FIG. 2 is a schematic representation of a packet switched exchange.

FIG. 2 is a schematic representation of a traditional packet switched exchange, such as an ATM exchange, in which the inventive buffer structure and method may be implemented. The exchange comprises an exchange core 1, one or more input ports 3 and one or more output ports 5. The input ports 3 and the output ports 5 are usually implemented on the same circuit board, but are shown in this schematic diagram as separate logical units. Between the input ports 3 and the exchange core 1 there may be one or more multiplexer devices 7 or the input ports can be connected directly to the exchange core 1 as shown for the input port 3'. Between the output ports 5 and the exchange core 1 there are one or more demultiplexer devices 9. The output ports 5 can also be connected directly to the exchange core 1, as shown for the output port 5'. The input ports 3, 3' are receivers of the backpressure message and have information about the buffer structure in the exchange.

In the example below a buffer structure of six levels is assumed: one buffer level in the input ports, one on the multiplexer level, two buffer levels in the exchange core, one on the demultiplexer level and one in the output ports. Each input port has a control unit controlling the buffer in the input port.

When a buffer on some level in the exchange reaches a too high degree of fullness, it transmits a backpressure message to the level above itself A threshold value for each data packet buffer is used to determine when the degree of fullness has become too high.

According to a preferred embodiment of the invention the backpressure message comprises a field comprising the digit 0. On the next level the digit is incremented to 1, and a field indicating the number of the originating buffer of the total number of buffers on the same hierarchical level is added. When the message reaches the next level, the digit in the first field is incremented by one, and a new field is added, indicating the number of the buffer that transmitted the message to this level. These two steps are repeated for each level passed by the message on its way to the input port. The number of bits needed for each field depends on the total number of buffers on the level in question.

After a certain period of time, determined on the basis of the rate at which the buffer is forwarding cells, data packets may again be transmitted to the buffer. The message format may also be extended, for example, by adding one or more data fields, such as the field fx in FIG. 1, in which the buffer having problems can transmit other information, for example, when the problems arise or come to an end. For example, the field fx can comprise the signal 1 when the problem arises and 0 when the problem has ended, so that the overloaded buffer can again receive new data packets. The field, or fields fx can also comprise information about how long the problems are expected to last that is, when new packets may again be transmitted to the buffer in question.

It is also possible to define more than one threshold value for the degree of fullness in the buffers. These threshold values may be set individually for each buffer. The backpressure signal can then comprise a field indicating the threshold value that has been exceeded. The lower threshold values may, for example, indicate that packets may still be transmitted to the buffer, but at a reduced bit rate. When the highest threshold value for a buffer has been passed, all traffic to the buffer in question should cease.

Figure 3:
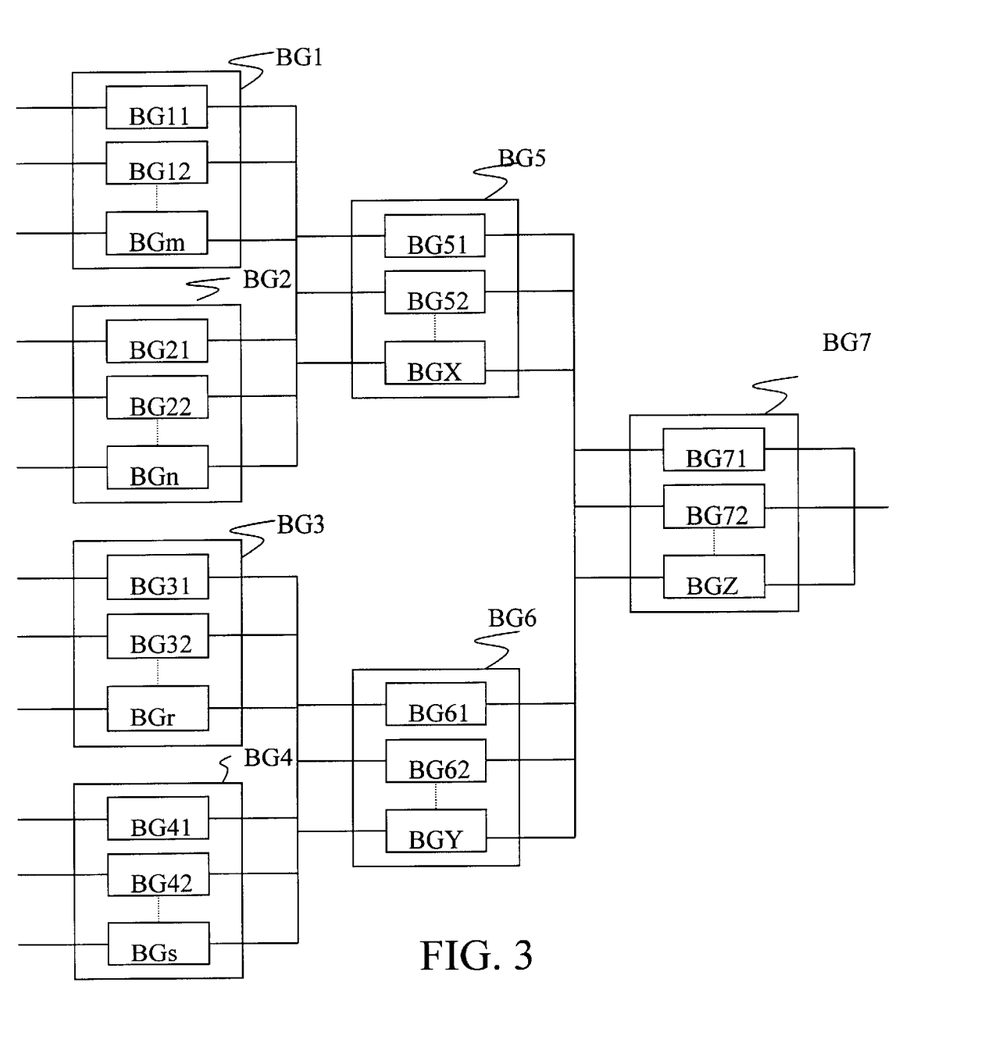
FIG. 3 shows an example of a buffer structure in which the inventive method may be applied.

FIG. 3 shows an example of a buffer structure in which the inventive method may be applied. The buffer structure comprises three buffer levels, but the person skilled in the art will easily see how a higher or lower number of buffer levels may be used with the inventive method. On the first level there are four buffer groups: BG1, having a number of m buffers numbered BG11, BG12, . . . , BGm, BG2, having n buffers numbered BG21, BG22, . . . , BGn, BG3, having r buffers numbered BG31, BG32, . . . , BGr, and BG4 having s buffers numbered BG41, BG42, . . . , BGs. On the second buffer level there are two buffer groups: BG5 having x buffers numbered BG51, BG51, . . . ; BGx and BG6, having 6 buffers numbered BG61, BG62, . . . , BGy. On the third buffer level there is one buffer group BG7 having z buffers numbered BG71, BG72, . . . , BGz.

The numbers m, n, r, s, x, y and z may be selected independently of each other but are often equal, for design reasons, since it is feasible to implement the buffer groups as similar circuits.

Each buffer in the buffer group BG5 can receive data packets form one or more buffers in the buffer groups BG1 and BG2. Each buffer in the buffer group BG6 can receive data packets from one or more buffers in the buffer groups BG3 and BG4. Each buffer in the buffer group BG7 can receive data packets from one or more buffers in the buffer groups BG5 and BG6.

For each level the following solutions are perceivable, which would imply certain modifications of the method:
1 Each buffer in a buffer group on a subsequent hierarchical level can receive data packets from each buffer in one or more buffer groups on the previous hierarchical level.
2 Each buffer in a buffer group on a subsequent hierarchical level can receive data packets from only one buffer in one or more buffer groups on the previous hierarchical level.
3 Each buffer in a buffer group on a subsequent hierarchical level can receive data packets from a subgroup of buffers in one or more buffer groups on the previous hierarchical level.

According to a first preferred embodiment there is a dedicated wire for backpressure messages from each buffer to each buffer group from which it receives data packets. In the example shown this would mean one wire from each of the buffers in BG5 to each of the buffer groups BG1 and BG2, a wire from each of the buffers in BG6 to each of the buffer groups BG3 and BG4 and a wire from each of the buffers in BG7 to each of the buffer groups BG5 and BG6. In addition there are dedicated wires on the buffer group levels, that is, from each buffer group to each of the buffer groups from which it receives data packets.

When a buffer in the buffer group BG5 has a problem, backpressure messages are sent to the buffer groups BG1 and BG2 on the dedicated wire from this buffer. When the buffer group BG5 receives a backpressure message from a buffer in the buffer group BG7, on the other hand, this message is forwarded on the buffer group level, to avoid the buffer groups BG1 and BG2 receiving the same backpressure message from all the x buffers in the buffer group BG5.

Assuming, for example, that the buffer BG52 in the buffer group BG5 has a problem, this buffer, according to the first embodiment, transmits a backpressure message to all buffers from which it can receive data packets, that is, one or more buffers in the buffer groups BG1 and BG2. The backpressure message, according to a preferred embodiment, comprises the number 0, and is in practice normally transmitted on a dedicated wire, not directly to each buffer, but to control circuitry associated with the buffers. For simplicity, however, it is described in this document as if the message is sent directly to each buffer.

When the backpressure message reaches the buffers in the buffer groups BG1 and BG2, these buffers know that it comes from the second of x buffers to which they can transmit data packets. In these buffers, therefore, a field is added to the message, holding the information 2(x). At the same time, the number 0 is incremented to 1 and the message is forwarded to the next buffer level, which is not shown.

Assuming, instead, that the buffer BG71 in the buffer group BG7 has a problem, this buffer, according to the invention, transmits a backpressure message to all buffers from which it can receive data packets, that is, one or more buffers in the buffer groups BG5 and BG6. The backpressure message consists, as above, of the number 0 and is in practice transmitted to control circuits associated with the buffers.

When the backpressure message reaches the buffers in the buffer groups BG5 and BG6, these buffers know that it comes from the first of z buffers to which they can transmit data packets. In these buffers, therefore, a field is added to the message, holding the information 1(z). At the same time the number 0 is incremented to 1 and the message is forwarded to the next buffer level, that is, from the buffer group BG5 to all the concerned buffers in the buffer groups BG1 and BG2, and from the buffer group BG6 to all the concerned buffers in the buffer groups BG3 and BG4. Here the number 1 is incremented to 2, and a field is added before the messages are forwarded to the next level, which is not shown.

According to a second preferred embodiment, dedicated wires are only found on the buffer group level, that is, from the buffer group BG7 to the buffer groups BG5 and BG6, from the buffer group BG5 to the buffer groups BG1 and BG2, and from the buffer group BG6 to the buffer groups BG3 and BG4. In this case a buffer group receiving a backpressure message can only know from what buffer group, but not from what buffer in this buffer group, the message came. According to this second embodiment, therefore, the backpressure message must comprise information about the number of the buffer, of the total number of buffers in the buffer group, when it is transmitted. For example, a message transmitted from the buffer group BG7 to the buffer groups BG5 and BG6 if the buffer BG72 had a problem, would have to comprise the information 2(z), to indicate that the backpressure message concerned the second of z buffers.

The FIGS. 4a–4d show the structure of the backpressure messages transmitted when the buffer BG71 in the buffer group BG7 in the buffer structure shown in FIG. 3, has a problem, according to the first preferred embodiment, described in connection with FIG. 3. In this case, there is a dedicated wire for backpressure messages from each buffer in the buffer group BG7 to the buffer groups BG5 and BG6. The message structure shown can also, as indicated by the field fx in FIG. 1, be extended by one or more fields, for example, a field holding more information about the type of problem, how long it is expected to last and/or the threshold value passed.

Figure 4A:
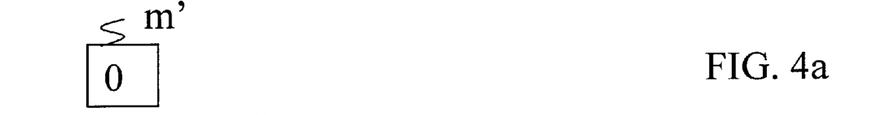
FIGS. 4a–4d show the structure of backpressure messages using relative addressing of buffers in a buffer structure in which all buffers in a group can transmit data packets to all buffers in the next group, according to a first embodiment of the invention.

FIG. 4a shows the message as is looks when it is transmitted form the buffer BG71 to the buffer groups BG5 and BG6. Only one field m' is used, comprising the digit 0.

Figure 4B:
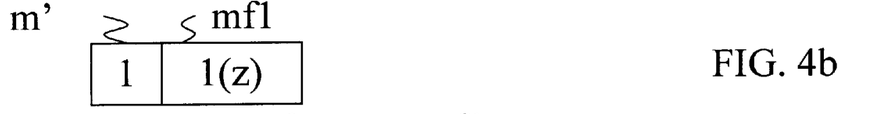

FIG. 4b shows the message as is looks when it is transmitted from each of the buffer groups BG5 and BG6 to the buffer groups BG1 and BG2, and BG3 and BG4, respectively. To the first message, a field mf1 has been added, comprising information about the number of the buffer from which the message was received, of z possible buffers, that is, 1(z).

Figure 4C:
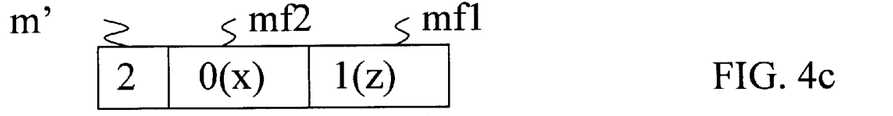

FIG. 4c shows the message as it looks when it is forwarded from the buffer groups BG1 and BG2 to the next level, which is not shown. A field mf2 comprising the information 0(x) has been added to the message shown in FIG. 4b, to indicate the buffer group from which the message was received.

Figure 4D:
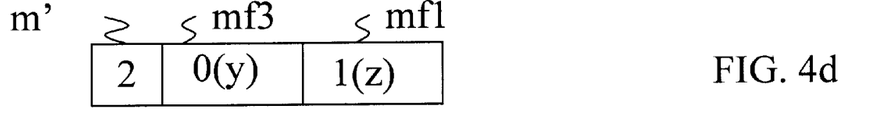

FIG. 4d shows the message as it looks when it is forwarded from the buffer groups BG3 and BG4 to the next level, which is not shown. A field mf3 holding the information 0(y) has been added to the message shown in FIG. 4b, to indicate the buffer group from which the message was received.

The number 0 in the fields mf2 and mf3 could be left out, but is used in this embodiment to indicate that all buffers in the buffer groups are affected by the message.

In the FIGS. 4a–4d it is assumed that all the buffers in a buffer group receive data packets from all the buffers in the buffer groups from which the buffer group receives data. It would also be possible to let some buffers in a buffer group receive data only from some buffers in another buffer group. This situation is shown in the FIGS. 5a–5f.

Figure 5A:
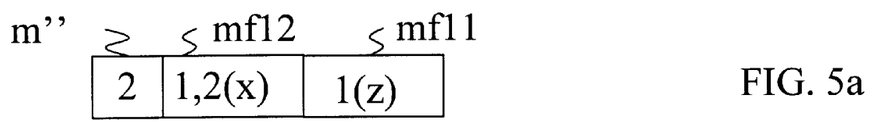
FIGS. 5a–5f show the structure of backpressure messages with relative addressing of buffers according to the first embodiment of the invention in a buffer structure in which all buffers in a group can transmit data packets to some of the buffers in the next group.

Assuming, for example, that the buffer BG71 can receive packets from the buffers BG51 and BGS2 in the buffer group BG5 and from the buffers BG63 and BG64 in the buffer group BG6, the backpressure message, when it reaches the buffer groups BG5 and BG6 will look like in FIG. 5a. Two buffers in each of the buffer groups BG5 and BG6 are affected. To indicate this, either all the affected buffers in a buffer group may be indicated in the same backpressure message, or a back-pressure message may be transmitted for each affected buffer.

In the prior case, only one message, looking as shown in FIG. 5a, is transmitted from the buffer group BG5 to the buffer groups BG1 and BG2. The message comprises a message level indicator field m", a field mf11 indicating the buffer that has the problem and a field mf12 identifying the buffers in the buffer group BG5 that are affected, that is the first and the second of a total of x buffers.

Figure 5B:
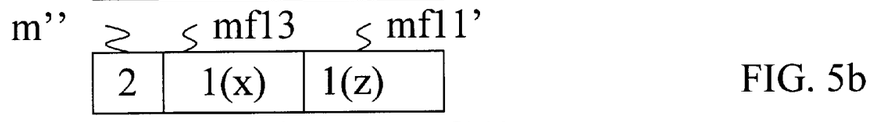
Figure 5C:
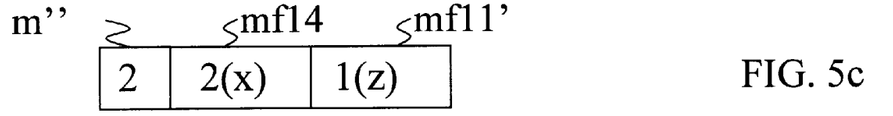

In the latter case, two messages are transmitted from the buffer group BG5 to each of the buffer groups BG1 and BG2, looking as shown in FIGS. 5b and 5c. The message comprises a message level indicator field m", a field mf11" pointing out the buffer that has the problem and a field mf13, mf14 identifying the buffer in the buffer group BG5 concerned by the message. Since the buffers BG51 and BGS2 are concerned, in FIG. 5b a field mf13 comprising the number 1(x) has been added, and in FIG. 5c a field mf14 comprising the number 2(x) has been added to the message shown in FIG. 5a.

Figure 5D:
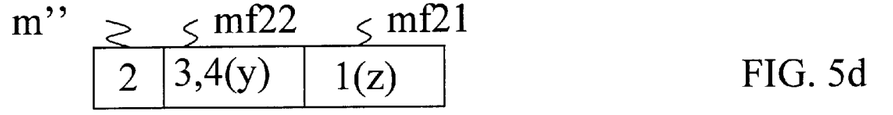
Figure 5E:
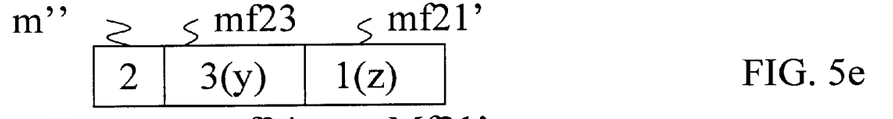
Figure 5F:
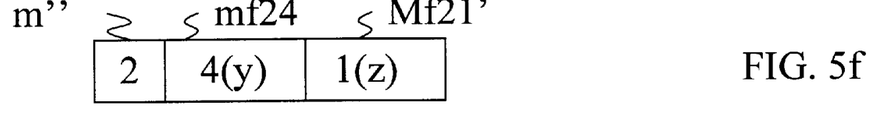

From the buffer group BG6 to the buffer groups BG3 and BG4, either a message like the one shown in FIG. 5d is transmitted, in which a field mf22 comprising the numbers 3,4(y) has been added. Alternatively, two messages, as shown in FIGS. 5e and 5f may be transmitted, one of which comprises a field mf23 indicating the buffer 3(y) and the other comprising a field mf24 indicating the buffer 4(y).

Figure 6A:
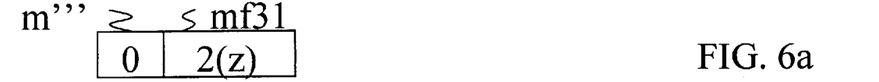
FIGS. 6a–6g show the structure of the backpressure messages with relative addressing of buffers according to a second embodiment of the invention.

FIGS. 6a–6g show the structure of the backpressure messages that are transmitted when the buffer BG72 in the buffer group BG7 in the buffer structure shown in FIG. 3 has a problem according to the second preferred embodiment described with reference to FIG. 3. In this case there is only one dedicated wire for backpressure messages from the whole buffer group BG7 to the buffer groups BG5 and BG6. The message structure shown can, as shown in FIG. 1, be extended by one or more fields, for example, a field comprising more information about the type of problem, how long it is expected to last, or the threshold value that has been passed. FIG. 6a shows the message as it looks when transmitted from the buffer group BG7 to the buffer groups BG5 and BG6. There is a start indicator field m'" comprising the number 0, followed by a field mf31 identifying the buffer, of the total number of buffers in the buffer group BG7 concerned by the message.

Figure 6B:
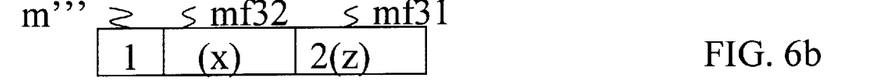

FIG. 6b shows the message as it looks when transmitted from the buffer group BG5 to the buffer groups BG1 and BG2. To the first message a field mf32 has been added, comprising information about the number of buffers in the buffer group from which the message is now forwarded, that is, (x).

Figure 6C:
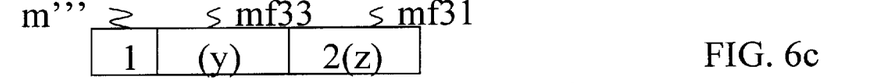

FIG. 6c shows the message as it looks when transmitted from the buffer group BG6 to the buffer groups BG3 and BG4. To the first message a field mf33 has been added, comprising information about the number of buffers in the buffer group from which the message is now being forwarded, that is, (y).

Figure 6D:
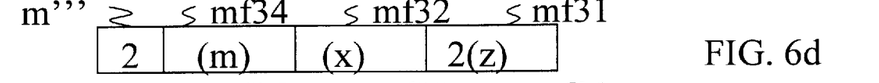

FIG. 6d shows the message as it looks when forwarded from the buffer group BG1 to the next level, which is not shown. A field mf34 comprising the information (m) has been added to the message shown in FIG. 6b, to indicate the number of buffers in the buffer group from which the message is now being forwarded.

Figure 6E:
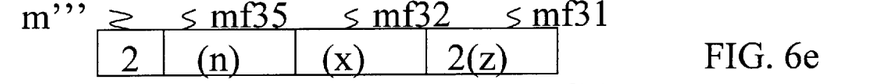

FIG. 6e shows the message as it looks when forwarded from the buffer group BG2 to the next, level which is not shown. A field mf35 comprising the information (n) has been added to the message shown in FIG. 6b to indicate the number of buffers in the buffer group from which the message is now being forwarded.

Figure 6F:
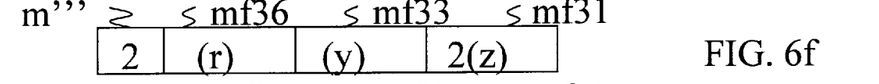

FIG. 6f shows the message as it looks when transmitted from the buffer group BG3 to the next level, which is not shown. A field mf36 comprising the information (r) has been added to the message shown in FIG. 6c, to indicate the number of buffers in the buffer group from which the message was received.

Figure 6G:
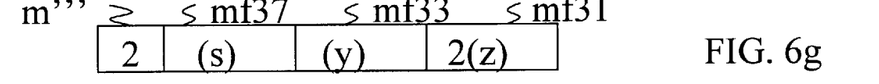

FIG. 6g shows the message as it looks when transmitted from the buffer group BG4 to the next level, which is not shown. A field mf37 comprising the information (s) has been added to the message shown in FIG. 6c, to indicate the number of buffers in the buffer group from which the message was received.

In the examples shown each new field is added just after the message level indicator field m'". Therefore, the field that was added first will be found at the end of the message. It is also possible to add each new field at the back of the message. Of course, each new field could be added in an arbitrary place in the message, for example, alternatingly at the back and at the front, but such solutions would only be unnecessarily complicated without adding any functionality, and are therefore not feasible.

Referring to the exchange structure shown in FIG. 2 the input ports are the receivers of the backpressure messages and therefore do not forward them. In the input port, therefore, no additional field has to be added. It is, however, possible for the input port to add information, for its own use, identifying the output buffer in the input port that is affected by the backpressure message.

It is also possible to let a backpressure message from a buffer be sent only to the next higher level in the buffer hierarchy. This would, however, imply that a buffer on the higher level receiving a backpressure message would be forced to stop transmitting to all buffers on the lower level, not only to the buffer having problems. With the inventive method, on the other hand, it is achieved that all sources transmitting data intended to pass the buffer having problems are queued in the input port, but no other traffic.

The above described principles of relative addressing can also advantageously be used in a packet switched network in which the nodes are, for example, data routers. Using the principle for relative addressing described above, an arbitrary node in the network does not have to know the architecture of the network, or its own position in the network. When the node in question has a need to signal, it transmits a message level indicator comprising, for example, the number 0, and a field, for example, identifying the buffer structure in the node that cannot be passed, to all nodes from which it receives signals. Each of these nodes increments the message level indicator to 1 and adds a field identifying the node, of the nodes to which it is connected, from which the message came. A node is identified in another node by its number of all the nodes receiving signals from the other node.

Figure 7:
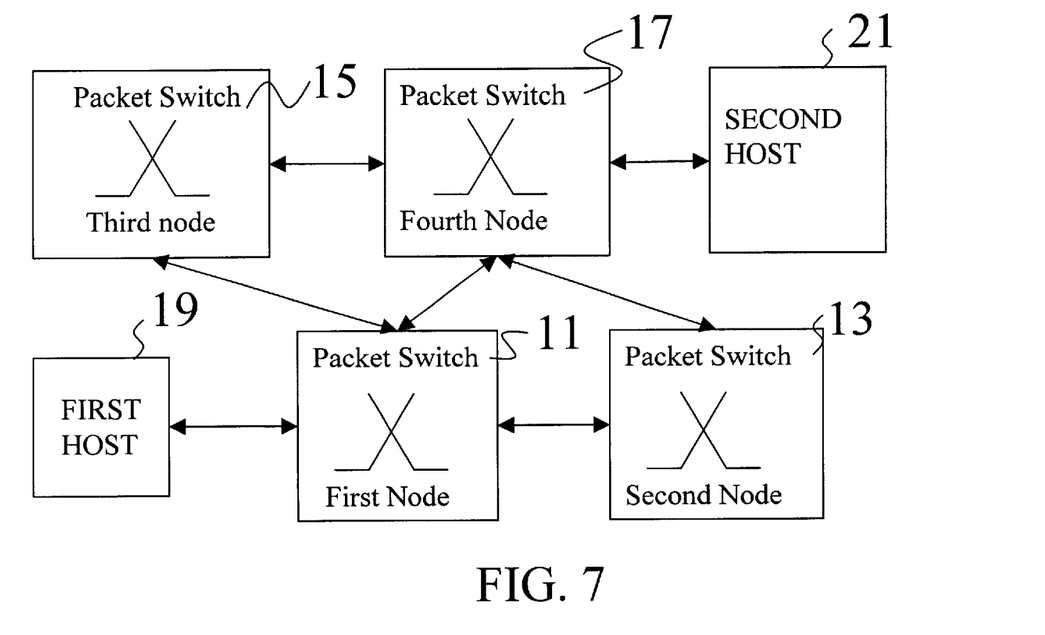
FIG. 7 shows a packet switched network in which the principle of flow control by means of relative addressing of buffers is applied.

FIG. 7 shows a packet switching network in which the inventive method is applied. The network in the example comprises a first node, for example a packet switch 11, connected to a second 13, a third 15 and a fourth 17 packet switch and a first host 19. The second 13 and the third node 15, and a second host 21 are also connected to the fourth node 17. All connections in the network are bi-directional.

Each node in the network knows the number of other nodes to which it is connected but, apart from that, does not have to know anything about the network architecture or its own position in this network architecture. The hosts, on the other hand, must have information about the architecture in the network so that they can determine which node is the source of a message and stop transmitting packets that will pass this node.

Assuming, for clarity, that the host 19 is transmitting data to the host 21 through the nodes 11 and 17. If the node 17 has a problem in the reception or the buffer structure towards the node 21 reaches a too high degree of fullness, it sends a backpressure message to all nodes in the network from which it can receive signals, that is, to all the nodes 11, 13 and 15, to the effect that it cannot transmit data packets to the host 21. In this case the backpressure message comprises a message level indicator field comprising the digit 0 and information about which one of the output buffer structures of the node has a problem. As described above the message can also comprise an information field, for example, to indicate the type of problem that has occurred, or if the signal means that the traffic should stop or that it can recommence.

When the switch 11 receives the backpressure signal, it adds a field indicating from which node the signal came. The switch 11 sees the switch 17 as number 2 of four nodes to which it is connected and therefore writes the digits 2(4) in the field. The message level indicator is incremented from 0 to 1 and the message is forwarded to the host 19, which is thereby prompted to stop transmitting packets intended to pass the node 17 and be forwarded to the host 21.

The backpressure signal is also received in the nodes 13 and 15 in the node 13 the node 17 is seen as the first of two nodes to which it is connected. The node 13 therefore adds a field comprising the digits 1(2) and increments the message level indicator to 1. From the node 13 the message is forwarded to the node 11 in which the message level indicator is incremented to 2 and a field comprising the digits 1(4) is added to indicate that the signal came from the first of the four nodes to which the node 11 is connected.

The backpressure signal also passes through the node 15 to the node 11 and on to the host 19, which therefore receives three backpressure messages from the same node regarding the same problem. The nodes that are to be sources of traffic in the network must therefore know the network architecture in detail to understand that these three signals have the same origin and, already when the first backpressure signal is received, stop all traffic that is intended to pass through the node 17 with the host 21 as destination, directly or through another node.

What is claimed is:

1. A method of controlling a data packet flow between at least two interconnected units, between which data packets are transferred in at least one direction, comprising the following steps:

transmitting a backpressure message from a receiving unit that is permanently or temporarily unable to receive data packets to the unit or units from which it is arranged to receive data packets wherein said backpressure message further comprises a message level indicator indicating the number of levels passed by said backpressure message;

for each unit that the message passes, changing or adding information to the message so that it comprises information about all units that the message has passed and further incrementing said message level indicator; and stopping all data packet flows intended to pass the unit from which the backpressure message originated, in the source or the sources of data packet flows, when a backpressure message is received.

2. A method according to claim 1, wherein said step of changing or adding information further comprises:

adding a field indicating from which unit the message last came, relative to the unit in which the message is currently found; and forwarding the message to all units from which the unit in which the message is currently found is arranged to receive data.

3. A method according to claim 1, wherein said step of changing or adding information further comprises:

adding a field indicating the unit in which the message is now located, relative to the level from which this unit is arranged to receive data packets; and forwarding the message to all units from which the unit in which the message is currently found is arranged to receive data.

4. A method according to claim 1, wherein the unit from which a backpressure message is received in another unit is identified by its number, of the total number of units, to which the receiving unit is connected.

5. A method according to claim 1, wherein a unit transmitting or forwarding a backpressure message adds information about the unit on the underlying level from which the message last came.

6. A method according to claim 1, further comprising setting a standard value for how long a backpressure message should be considered valid.

7. A method according to claim 1, wherein the unit from which the backpressure message originates also adds an extra field arranged to contain additional information.

8. A method according to claim 7, wherein the field for additional information is arranged to assume one of two possible values indicating that the backpressure message signifies the start of the problems and that the problems have ceased, respectively.

9. A method according to claim 7 wherein said receiving unit further comprises a buffer and, wherein the field for additional information comprises information about the degree of fullness of the buffer, indicating the action to be taken by the receiving unit in response to the backpressure message.

10. A method according to claim 7, wherein the field for additional information comprises information about the length of the period in which the backpressure message should be considered valid.

11. A method according to claim 1, wherein the unit from which the backpressure message originates is a buffer in a hierarchy of buffers in a packet switch, and the unit receiving and acting on the backpressure message is a buffer on a higher level in the same buffer hierarchy.

12. A method according to claim 1, wherein the unit from which the backpressure message originates is a node in a packet switched network, and the unit receiving and acting on the backpressure message is a host in said packet switched network.

13. A hierarchical structure of buffers in which each buffer is arranged to receive data packets from at least one buffer on a preceding hierarchical level and to transmit data packets to at least one buffer on a succeeding hierarchical level, wherein for each buffer, or for a group of buffers on the same hierarchical level, control logic is provided, arranged to:

compare the degree of fullness of the buffer or buffers to one or more threshold values;

when the degree of fullness of a buffer exceeds a threshold value, transmit a backpressure message to the preceding hierarchical level wherein said backpressure message comprises a message level indicator indicating the number of levels passed by said message; and when such a backpressure message is received from the control logic of a buffer on a subsequent hierarchical level, change or add information to this message so that it will comprise information about the unit the message has passed and further incrementing said message level indicator by one (1).

14. A hierarchical buffer structure according to claim 13, wherein each buffer, or its control logic, is arranged to perform the following steps when a backpressure message is received:

add a field identifying the buffer or buffer group on the next succeeding hierarchical level from which the backpressure message came, relative to the unit in which the backpressure message is currently found; and forward the backpressure message to the nearest preceding hierarchical level.

15. A hierarchical structure of buffers according to claim 13, wherein each buffer, or its control logic, is arranged to perform the following steps when a backpressure message is received:

add a field identifying the buffer or buffer group in which the backpressure message is currently found, relative to the next preceding hierarchical level; and forward the backpressure message to the next preceding hierarchical level.

16. A packet switch comprising a hierarchical structure of buffers, each buffer being arranged to receive data packets from one or more buffers on the nearest preceding hierarchical level and to transmit data packets to one or more buffers on the next succeeding hierarchical level, each buffer further being arranged to:

when it reaches a certain degree of fullness, transmit a backpressure message to all buffers from which it receives data packets to signify that it cannot receive any more data packets; and when it receives a backpressure message from the preceding hierarchical level, add information identifying the buffers, of the buffers to which this buffer transmits packets, from which the backpressure message came, and forward the message to all buffers from which it receives data packets and wherein said received backpressure message further includes a message level indicator indicating the number of levels passed by said message within said hierarchical levels and wherein said message level indicator is incremented by one (1) each time said message is forwarded.

17. A packet switched network comprising a hierarchical structure of nodes, each node being arranged to receive packets from one or more other nodes, each node being arranged to:

when a problem with the reception or transmission of packets to or from the node arises, transmitting a backpressure message indicating the character of the problem to all nodes in the network from which the node receives packets wherein said backpressure message comprises a message level indicator for indicating the number of levels passed by said message within said hierarchical structure of nodes; and when a backpressure message is received, adding information to the message so that the message comprises information about all nodes the message has passed and further incrementing said message level indicator by one (1).

18. A node according to claim 17, wherein the information added to the backpressure message includes a total number of nodes passed by said backpressure message within said packet switched network.

* * * * *